May 30, 1933.  W. F. HUCK  1,912,201
CHUCK
Filed March 21, 1931   2 Sheets-Sheet 1
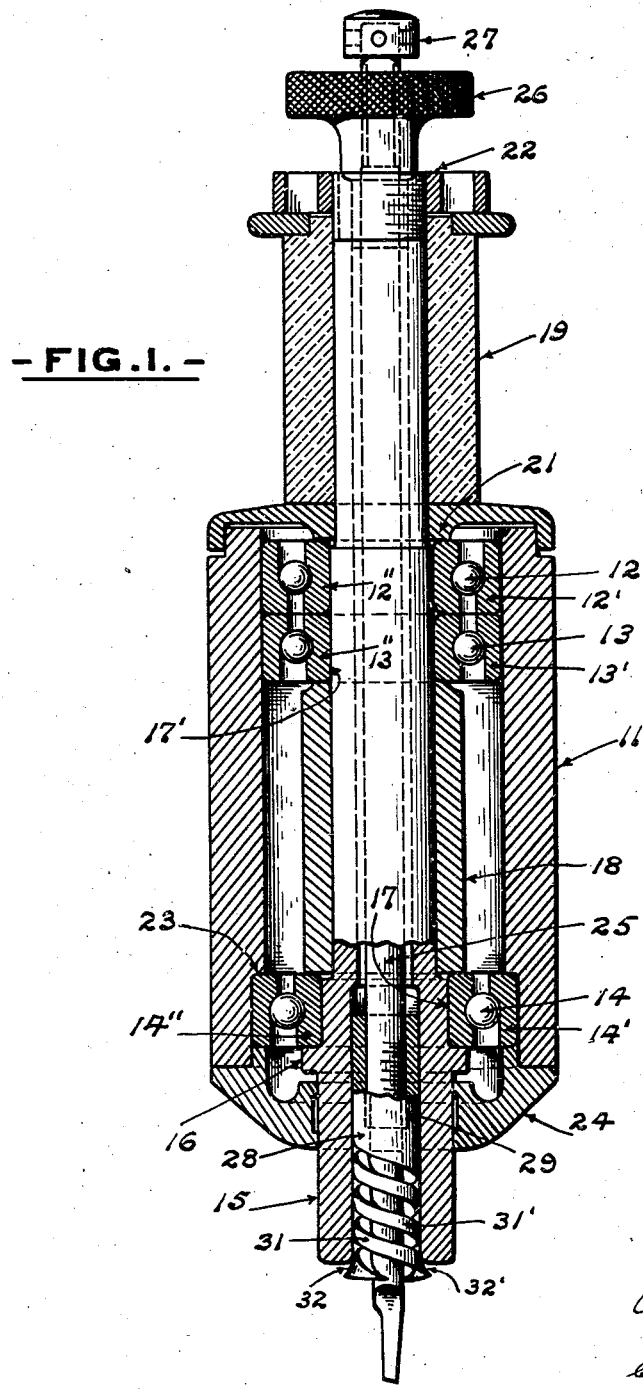
FIG. I.
INVENTOR.
William F. Huck
by John R. Tomlin
ATT'Y.

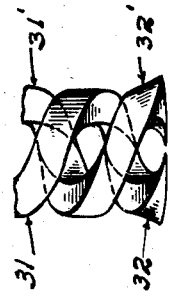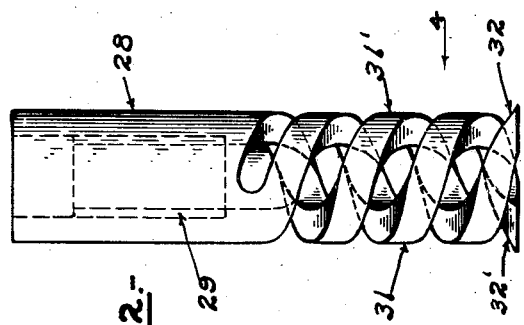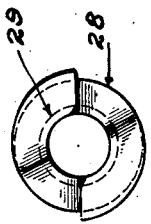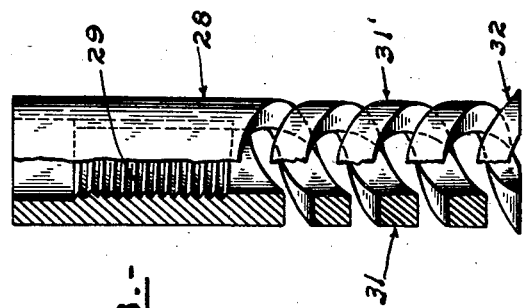

Patented May 30, 1933

1,912,201

UNITED STATES PATENT OFFICE

WILLIAM F. HUCK, OF RICHMOND HILL, NEW YORK, ASSIGNOR TO R. HOE & CO., INC., OF NEW YORK, N. Y., A CORPORATION OF NEW YORK

CHUCK

Application filed March 21, 1931. Serial No. 524,331.

The invention relates to chucks that are used for holding a cutting or boring-tool securely in a suitable support. The device may be employed in connection with various tool holders and machines. As herein shown, it is adapted to a routing machine that is used in preparing electrotype and stereotype plates for use in printing machines. A routing machine has a spindle that rotates at high speed, and router bits having cylindrical shanks are held in a chuck that is secured to or forms part of the spindle. It is necessary that the bit be securely held to prevent its rotation relative to the spindle, and also that it be held in accurate alignment with the spindle.

The object of the invention is to provide a chuck adapted to grip the shank of a tool in a plurality of points peripherally and longitudinally of its surface.

Another object of the invention is to provide a chuck that is adapted to hold a tool in accurate axial alignment with a support.

It is also an object of the invention to provide a chuck of generally improved construction, whereby the device will be simple, durable and inexpensive in construction, as well as convenient, practical, serviceable and efficient in its use.

With the foregoing and other objects in view, which will appear as the description proceeds, the invention resides in the combination and arrangement of parts, and in the details of construction hereinafter described and claimed, it being understood that various changes in the precise embodiment of the invention herein disclosed may be made within the scope of what is claimed without departing from the spirit of the invention.

One embodiment of the invention is illustrated in the accompanying drawings, wherein:

Figure 1 shows a sectional view of a router head incorporating the chuck that is the subject of the invention;

Figure 2 is an enlarged view of the chuck jaw member removed from the spindle and showing the helically formed jaws that grip the tool;

Figure 3 is a view similar to Figure 2, partly broken away to show portions of the jaw member in section;

Figure 4 is a fragmental side view of the jaw member as seen in the direction of arrow 4 of Figure 2; and Figure 5 is a bottom view of the jaw member as seen in the direction of arrow 5 of Figure 2.

Referring to Figure 1, the numeral 11 indicates the body portion of the head of a routing machine, such as is used in the preparation of electrotype and stereotype printing plates to cut away excess metal from the non-printing portions of the plates. In this work, router bits of various sizes are used, depending on the character of the plate that is being operated upon. These bits are commonly made with cylindrical shanks of approximately uniform diameter and are held in a spindle that is rotated on a vertical axis, in a head that may be moved by the operator in order to guide the tool in the desired path.

Ball bearings are indicated generally at 12, 13 and 14, and have outer races 12″, 13′ and 14′, fitted to the body member 11. A spindle 15 is formed with a flange 16 and a seat 17 fitted to the inner race 14″ of the bearing 14. A smaller diameter seat 17′ is similarly fitted to the inner races 12″ and 13″ of the bearings 12 and 13, and a spacing collar 18 is placed on the spindle between the races 13″ and 14″.

A pulley 19 have a flange 21, which abuts against the inner race 12″, and a nut 22 is threaded on the spindle 15, and secures the inner races of the bearings and the pulley in position on the spindle.

The body member 11 is provided with a shoulder 23, fitted to the outer race 14′ of the bearing 14, and the cap 24 is secured to the body member 11 and also engages the outer race 14′, holding it in position. The spindle is thus rotatably held in the jaws and may be driven by a belt running on the pulley 19.

The spindle as herein shown is made hollow and constitutes an outer member of the chuck. A rod 25 is threaded at its upper end to engage a thumb nut 26 and has a cap 27 secured to its upper extremity. The lower end of the rod is preferably secured to the inner chuck or jaw member 28. As herein shown, it is held by a screw thread, but any suitable means may be employed, or the jaw member and rod may be made in one piece.

The jaw member 28 is fitted to slide in the spindle 15 and is provided with an internal thread 29, which engages with the rod 25. The lower portion of the jaw member is cut away to form helical coils 31 and 31' which have an inside diameter slightly larger than the diameter of the shanks of the bits which it is designed to hold. The outside diameter of the coils is preferably made the same as that of the body of the jaw member, except at their lower extremities, where the diameter is enlarged and tapered faces are formed as indicated at 32 and 32'. These tapered faces engage with the wall of the spindle 15.

In operation, the shank of the bit is placed within the coils of the jaw member and the nut 26 is screwed down on the rod 25. The nut 26 engages the wall of the spindle 15 at its upper end and the jaw member 28 is thus raised until the inclined faces 32 and 32' engage with the wall of the spindle 15 at its lower end. Continued turning of the nut 26 results in first closing the extremities of the coils of the jaw member so they are tightened on the shank, and still further tightening of the nut results in elongating the jaw member 28 and contracting the coils so that the shank is held rigidly and accurately centered in the spindle.

What I claim is:

1. In a means for holding a tool having a shank, a helically formed coil adapted to receive the shank, and means other than the tool to elongate and thereby constrict the coil to grip the shank.

2. In a chuck adapted to hold a tool having a shank, a helically formed chuck member adapted to receive the shank, and means secured to said member and bodily moving same as a unit longitudinally within an outer member connected thereto to elongate and thereby contract the said chuck member to grip the shank.

3. In a chuck for holding a tool having a cylindrical shank, an inner chuck member having helical means integral therewith and formed to receive the shank, an outer chuck member adapted to engage with one end of the helical means, and other means to elongate and thereby contract the helical means.

4. In a chuck for holding a tool having a cylindrical shank, an inner chuck member having helical means integral therewith and formed to receive the shank, an outer chuck member adapted to engage with one end of the inner member, and means engaging the other end of the inner member whereby the helical means may be elongated and thereby contracted diametrically to grip the shank.

5. In a chuck for operatively holding and centering a rotary tool having a cylindrical shank, a jaw member having a helical coil formed to surround the shank, an outer member within which the jaw member is movable axially, a face adjacent one end of the jaw member, adapted to engage with the outer member, and means acting on the other end of the jaw member to elongate it and contract the coil diametrically.

6. In a chuck for operatively holding and centering a rotary tool having a cylindrical shank, a jaw member having a helical coil formed to surround the shank, an outer member within which the jaw member is movable axially, an inclined surface on one end of the jaw member adapted to engage with one end of the outer member, and means connected to the other end of the jaw member and cooperating with the other end of the outer member whereby the coil may be elongated to contract it diametrically.

7. In a device for holding a rotatable cutting tool having a shank, a spindle, a jaw member movable axially in the spindle and having a helical coil adapted to receive the shank, an inclined surface at one extremity of the coil adapted to engage with one end of the spindle, a rod connected to the jaw member, and a nut threaded on the rod and engaging the spindle whereby the coil may be elongated and simultaneously contracted diametrically to grip the tool.

8. In a chuck for holding a tool having a cylindrical shank, a jaw member having a plurality of helical coils formed to encircle the shank, and means to elongate the coils and to contract them diametrically to grip the shank.

9. In a chuck for operatively holding a tool having a cylindrical shank, an inner chuck member having a plurality of helical coils formed to encircle the shank, an outer chuck member adapted to engage with one end of each coil, and means to elongate and to contract the coils diametrically.

10. In a chuck for operatively holding a tool having a cylindrical shank, an inner chuck member having a plurality of helically formed coils adapted to receive the shank, an outer chuck member adapted to engage with one end of the inner chuck member, and means adapted to pull on the other end of the chuck member and thereby contract the coils diametrically.

11. In a chuck for operatively holding a tool having a cylindrical shank, a jaw member having a plurality of helical coils formed to surround the shank, an outer member within which the jaw member is movable axially, means adjacent one end of the jaw member adapted to engage with the outer member, and means acting on the other end of the jaw member to elongate the coils and to contract them diametrically.

12. In a chuck for operatively holding a tool having a cylindrical shank, a jaw member having a plurality of helical coils formed to surround the shank, an outer member within which the jaw member is movable axially, an inclined surface on one end of each coil adapted to engage with one end of the outer member, and means coacting with the jaw member and co-operating with the other end of the outer member whereby the said jaw member may be elongated and the coils contracted diametrically.

13. In a chuck for operatively holding a rotary tool having a cylindrical shank, an inner chuck member having a plurality of helically-formed coils individually adapted to frictionally engage the said shank, an outer chuck member engageable with one of the inner chuck, and means secured to the chuck for pulling on to the other end of the chuck member and thereby contracting the said coils diametrically into a closer frictional engagement with the shank.

14. In a chuck for operatively holding a rotary tool having a cylindrical shank, an inner chuck member having a plurality of helically formed coils individually adapted to frictionally engage the said shank, an outer chuck member wedgingly engageable with tapered portions formed on the coils, and means threadedly secured to the chuck for shifting same axially and thereby contracting the said coils when the said coils are moved inwardly relatively to the outer chuck while said tapered portions are wedgingly engaged with the outer chuck member.

15. In a chuck for operatively holding a rotary tool having a cylindrical shank, a jaw member having a helical coil formed to encircle and frictionally engage the shank at different portions of the periphery thereof, a cylindrical member receiving said helical coil and contacting directly with said jaw member, and means engaged with the helical coil and coactable with the cylindrical member for elongating the said coil to contract same diametrically into frictionally engagement with the periphery of the shank.

In testimony whereof, I affix my signature.

WILLIAM F. HUCK.